United States Patent
Tang et al.

(10) Patent No.: US 7,891,464 B2
(45) Date of Patent: Feb. 22, 2011

(54) SYSTEM AND METHOD FOR NOISE SUPPRESSION

(75) Inventors: Punan Tang, Houston, TX (US); Thomas P. Jasso, Houston, TX (US); Mohammed I. Chowdhury, Houston, TX (US)

(73) Assignee: Hewlett-Packard Development, L.P., Houston, TX (US)

( * ) Notice: Subject to any disclaimer, the term of this patent is extended or adjusted under 35 U.S.C. 154(b) by 989 days.

(21) Appl. No.: 11/453,694

(22) Filed: Jun. 15, 2006

(65) Prior Publication Data

US 2007/0292261 A1 Dec. 20, 2007

(51) Int. Cl.
*F01N 1/04* (2006.01)
*E04F 17/04* (2006.01)

(52) U.S. Cl. .................. 181/225; 181/224; 361/695
(58) Field of Classification Search ............. 181/224, 181/225, 271; 415/119; 361/679.49, 690, 361/692, 695
See application file for complete search history.

(56) References Cited

U.S. PATENT DOCUMENTS

| | | | |
|---|---|---|---|
| 4,089,618 A | | 5/1978 | Patel |
| 4,091,892 A | * | 5/1978 | Hehmann et al. ........... 181/286 |
| 5,448,645 A | | 9/1995 | Guerci |
| 5,478,199 A | | 12/1995 | Gliebe |
| 5,710,533 A | | 1/1998 | Pla et al. |
| 5,735,313 A | * | 4/1998 | Jenski et al. .................. 138/30 |
| 5,749,702 A | * | 5/1998 | Datta et al. ................. 415/119 |
| 5,869,792 A | * | 2/1999 | Allen et al. .................. 181/224 |
| 5,930,371 A | * | 7/1999 | Cheng et al. ................ 381/71.5 |
| 5,962,821 A | * | 10/1999 | Iannetti ....................... 181/256 |
| 6,067,227 A | * | 5/2000 | Katsui et al. ................. 361/695 |
| 6,104,608 A | * | 8/2000 | Casinelli et al. ............. 361/692 |
| 6,201,872 B1 | | 3/2001 | Hersh et al. |
| 6,244,817 B1 | * | 6/2001 | Ngo ........................... 415/119 |
| 6,278,958 B1 | | 8/2001 | Lee et al. |
| 6,309,176 B1 | * | 10/2001 | Periyathamby et al. ..... 415/119 |
| 6,379,110 B1 | * | 4/2002 | McCormick et al. ........ 415/119 |
| 6,379,111 B1 | | 4/2002 | Katoh et al. |
| 6,390,770 B1 | * | 5/2002 | Takeshita .................... 415/119 |
| 6,457,550 B1 | * | 10/2002 | Barry et al. .................. 181/224 |
| 6,499,956 B2 | * | 12/2002 | Nakamura ................... 416/189 |

(Continued)

FOREIGN PATENT DOCUMENTS

EP 683361 A2 * 11/1995

(Continued)

OTHER PUBLICATIONS

Leo L. Beranek et al., *Noise and Vibration Control Engineering*, 1992, John Wiley & Sons, Inc.

(Continued)

*Primary Examiner*—Elvin G Enad
*Assistant Examiner*—Jeremy Luks

(57) ABSTRACT

Embodiments of the present invention relate to a system and method for noise suppression. Specifically, embodiments of the present invention include a resonator configured to suppress noise from an electric fan. The resonator may comprise an enclosure having an outer perimeter, a major opening through the enclosure and defining an inner perimeter of the enclosure, a minor opening disposed along the inner perimeter, and a chamber coupled to the minor opening within the enclosure between the inner and outer perimeters.

29 Claims, 6 Drawing Sheets

U.S. PATENT DOCUMENTS

| | | | |
|---|---|---|---|
| 6,501,652 B2 * | 12/2002 | Katsui | 361/697 |
| 6,582,183 B2 * | 6/2003 | Eveker et al. | 415/1 |
| 6,609,592 B2 * | 8/2003 | Wilson | 181/292 |
| 6,626,640 B2 | 9/2003 | Ivanovic | |
| 6,755,616 B1 | 6/2004 | Tzeng | |
| 6,802,386 B2 * | 10/2004 | Koelle | 181/224 |
| 6,880,813 B2 * | 4/2005 | Yazici et al. | 261/29 |
| 6,896,095 B2 * | 5/2005 | Shah et al. | 181/198 |
| 2001/0014163 A1 * | 8/2001 | Hickman et al. | 381/71.5 |
| 2002/0059959 A1 * | 5/2002 | Qatu et al. | 138/30 |
| 2005/0011697 A1 * | 1/2005 | Arlasky | 181/225 |
| 2005/0161280 A1 * | 7/2005 | Furuya | 181/225 |
| 2005/0205351 A1 * | 9/2005 | D'Angelo | 181/216 |
| 2006/0054380 A1 * | 3/2006 | Doll | 181/225 |

FOREIGN PATENT DOCUMENTS

| | | | |
|---|---|---|---|
| GB | 2252632 A * | 8/1992 | |
| JP | 01169194 A * | 7/1989 | |
| JP | 11093670 A * | 4/1999 | |
| WO | WO 2004061817 A1 * | 7/2004 | |

OTHER PUBLICATIONS

Stephen Horowitz et al. *Characterization of Compliant-Backplate Helmholtz Resonators for an Electromechanical Acoustics Liner*, $40^{th}$ Aerospace Sciences Meeting & Exhibit, Jan. 14-17, 2002, Reno NV., pp. 1-10.

Xiaofan Li, et al., *Optimized Shapes of Oscillating Resonators for Generating High-Amplitude Pressure Waves*, J. Acoust. Soc. Am., vol. #116, No. 5, Nov. 2004, pp. 2814-2821.

Punan Tang; *A High Performance Acoustical Resonator for the Fan Tones Noise Suppression*; Abstract for HP TechCon 2006, Apr. 2-5. Los Angles, CA., pp. 1-5.

* cited by examiner

SYSTEM AND METHOD FOR NOISE SUPPRESSION

BACKGROUND

Computers, such as servers, personal computers (PCs), and notebook computers, have seen dramatic increases in processing speed and performance while becoming smaller in size than their predecessors. As a result of these changes in performance and size, efficient cooling systems are increasingly important to remove greater amounts of heat per volume of space in the computers. Existing computers often employ multiple fans and/or higher rotational speeds, which cause significant noise particularly in rack systems having dozens of fans.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present invention are directed to space efficient systems and apparatuses for reducing or suppressing noise emissions related to forced air computer cooling systems. Specifically, embodiments of the present invention are directed to suppressing single tone and multi-tone noises that dominate noise components emitted as a result of turbulent air flow and/or air moving devices (e.g., fans) utilized in forced air cooling systems. Further, present embodiments may include devices that are tunable. Specifically, for example, present embodiments may be configured such that they can be tuned (e.g., adjusted or constructed in various absorption configurations) to reduce or suppress specific tonal noises. It should be noted that embodiments may include or be implemented with various types of electronics, computers, and computer systems. For example, embodiments of the present invention may be utilized in blade server systems, distributed control systems, personal computers, notebook computers, and so forth to reduce the propagation of noise produced by their respective forced air cooling systems (e.g., one or more fans).

Figure 1:
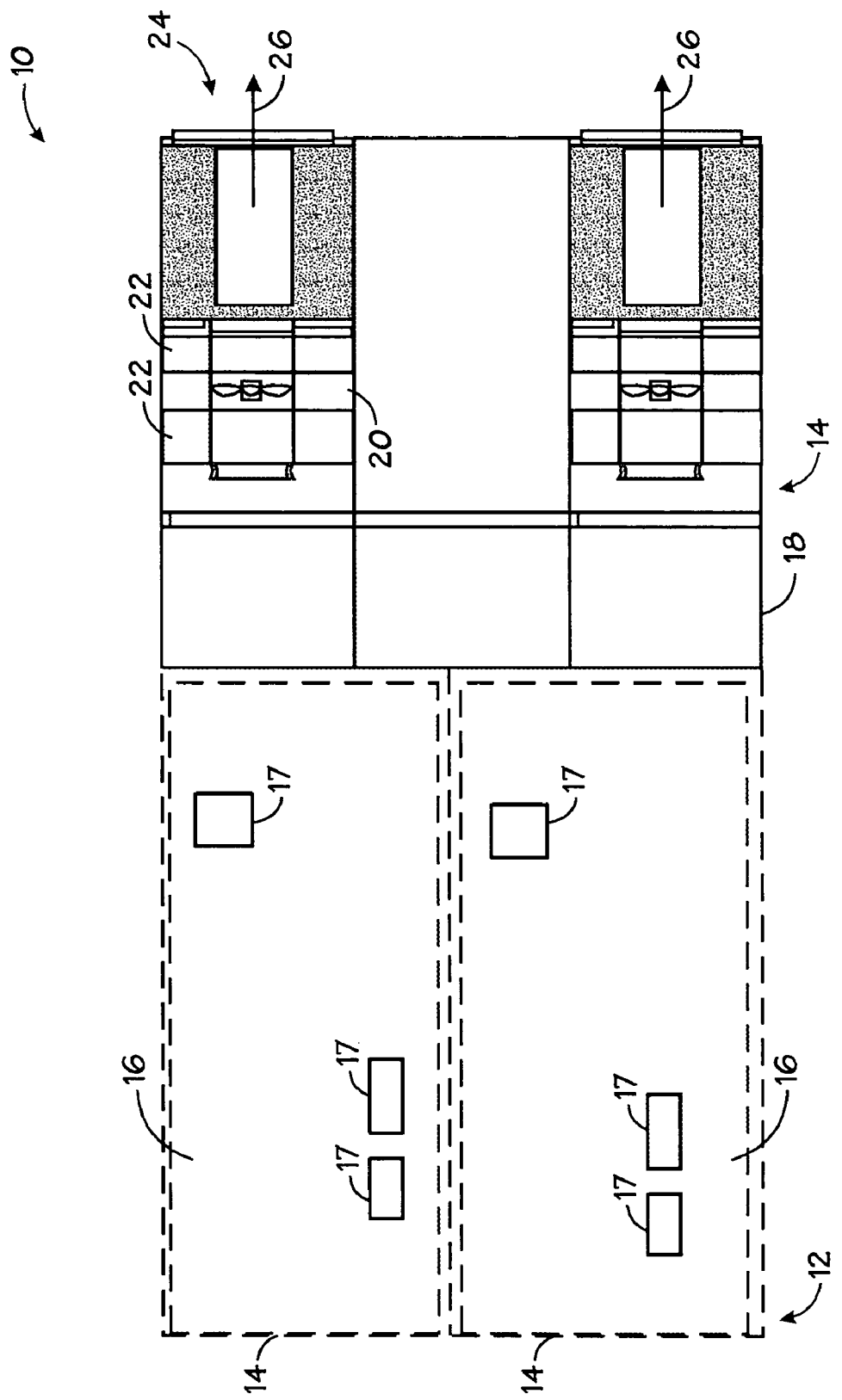
FIG. 1 is a cross-sectional side view of a server system utilizing noise suppression components in accordance with embodiments of the present invention.

FIG. 1 is a cross-sectional side view of a server system 10 utilizing noise suppression components (e.g., noise suppression mechanisms or resonators 22) in accordance with embodiments of the present invention. As discussed in detail below, the resonators 22 may be positioned adjacent or in a flow path 26 of one or more fans 20, such that the resonators 22 substantially reduce noise from the fans 20. The server system 10 includes a chassis 12 attached to a forced air cooling system 14. The cooling system 14 is configured to cool various components in the chassis 12. It should be noted that this is merely an exemplary embodiment and other embodiments may include configurations for cooling different devices. The chassis 12 includes two substantially identical bays 14, each of which is arranged to hold at least one computer module or server 16. The forced air cooling system 14 includes one or more air passages 18, one or more fans 20, one or more noise suppression mechanisms or resonators 22, and one or more exhausts 24. The air passage 18 links the server 16 with the forced air cooling system 14 and facilitates air flow over the server 16 and into the drive mechanism 20 of the cooling system 14.

In the illustrated embodiment, the fans 20 are configured to force air through the server system 10 to force convection heat transfer away from components, e.g., processors, memory, hard drives, and so forth. Specifically, in the illustrated embodiment, the fans 20 are arranged to pull air through and/or across the servers 16 disposed in the chassis 12. This flow of air over the servers 16 facilitates heat transfer between the servers 16 and the flowing air. For example, the servers 16 may create heat during operation causing the temperature of the servers 16 to exceed the temperature of ambient or cooled air being forced through the system 10. Some of this heat from the servers 16 may be transferred into the air flowing over the servers 16. Once the air has absorbed some of the heat being emitted from the servers 16, the air is expelled from the server system 10 via the exhaust 24 of the cooling system 14, thus removing heat from the servers 16 and generally cooling the server system 10.

It should be noted that in some embodiments, the fans 20 may be reoriented or reversed to push air rather than pull the air through and/or across the servers 16. Further, while the illustrated embodiment employs a pair of resonators 22 for each fan 20, other embodiments may utilize a single resonator 22 or more than two resonators 22 for each fan 20. Additionally, it should be noted that the illustrated server system 10 is merely one example of an application in accordance with embodiments of the present invention. Other embodiments may be utilized in various computer applications in addition to server systems, such as server system 10. For example, the servers 16 may be exemplary of any number heat producing computer components in a wide variety of computer systems, wherein it is desirable to cool the components during operation. Specifically, for example, the servers 16 may be representative of a processor or a power supply in a standard personal computing system or notebook computer.

In the illustrated embodiment, the cooling system 14 utilizes the fans 20 to induce forced air convection to remove a certain amount of heat from the servers 16 and various computer components 17, such as one or more processors, memory, hard drives, video cards, power supplies, computers, video devices, audio devices, or a combination thereof.

Because of variations in conditions (e.g., ambient temperature) relating to cooling the system 10, it may be desirable to increase the forced air convection. For example, it may be desirable to increase convection to increase the amount of heat being removed from the system 10. Increased heat removal using the fan driven forced air cooling system 14 may be achieved by increasing the flow rate through the cooling system 14. Such an increase in flow rate may be achieved by increasing the size of the fan 20 (e.g., larger fan blades) or by increasing the rotational speed of the fan 20. Because space may be limited, the preferred option may be to increase the speed of the fan 20. However, increasing fan 20 speed typically results in a corresponding increase in noise generated by the fan 20. Specifically, the moving components of the fan 20 or the turbulent air generated by the fan 20 may produce tonal noise in the working environment around the system 10. Thus, in accordance with present embodiments, the cooling system 14 includes the resonators 22 for tonal noise suppression.

Figure 2:
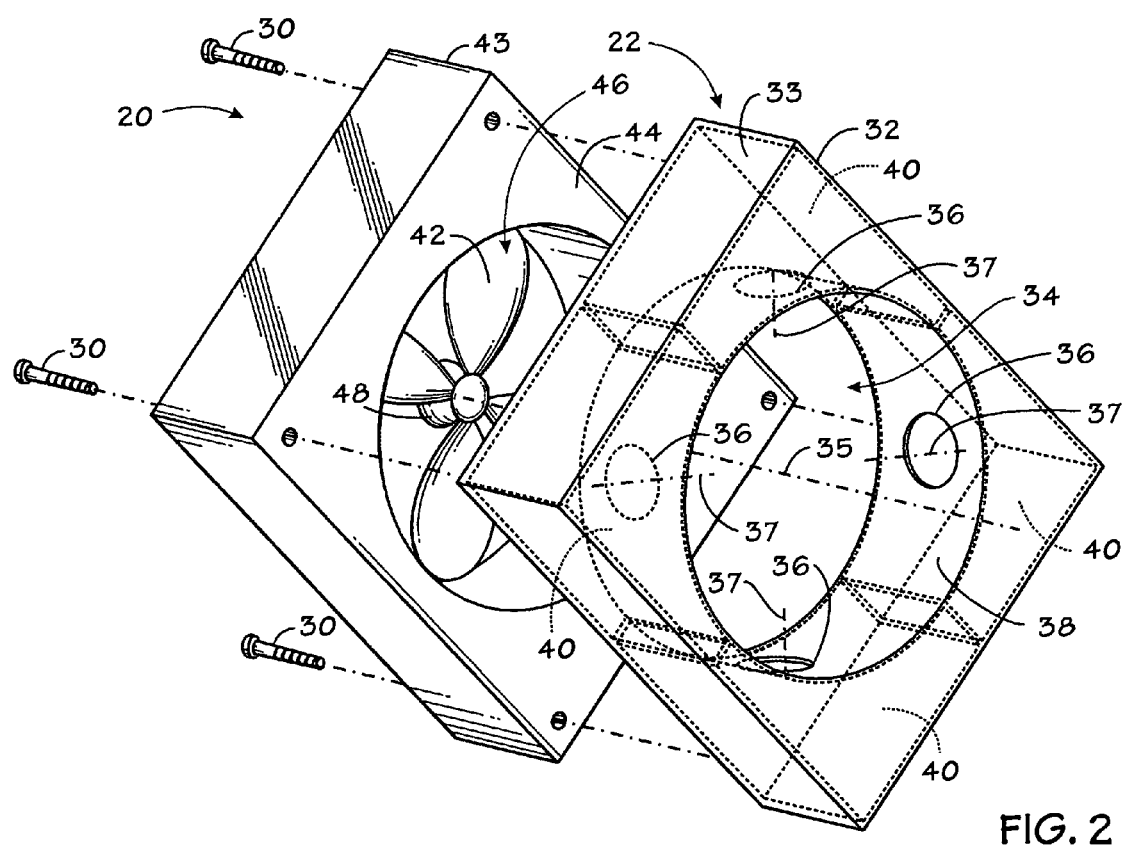
FIG. 2 is an exploded perspective view of one of the resonators and the fan in accordance with embodiments of the present invention.

FIG. 2 is an exploded perspective view of one of the resonators 22 and the fan 20 in accordance with embodiments of the present invention. The fan 20 and the resonator 22 may be coupled via a fastener 30 (e.g., screw, tape, glue, tack) or set of fasteners 30. The resonator 22 includes a modular enclosure or shell 32 having a rectangular outer surface 33 and a central or major opening 34 extending along a flow axis 35 of the fan 20 to facilitate air flow. The major opening 34 also facilitates the transmission of sound (e.g., tonal noise) from the fan 20. The resonator 22 also includes various minor openings 36 having axes 37 and extending through an inner surface 38 of the major opening 34. In the illustrated embodiment, the major opening 34 is a cylindrical passage and the minor openings 36 are generally circular openings. However, other shapes may be employed for openings 34 and 36. Each minor opening 36 may be arranged such that its axis 37 is generally perpendicular or radial to the axis 35 of the major opening 34. Indeed, axes 37 of the minor openings 36 and the axis 37 of the major opening 34 may be generally crosswise relative to one another. The major opening 34 may also be referred to as a primary passage, flow path, or cooling air flow conduit. The minor openings 36 may also be referred to as lateral openings, chamber openings, radial openings, or tonal suppression openings. The minor openings 36 are passages to chambers 40 formed within the shell 32. These chambers 40 and/or the minor openings 36 may be sized or configured to suppress certain tonal noise from the fan 20. The fan 20 includes fan blades 42 and a modular case 44 having a central hub, passage, or fan chamber 46 disposed about the fan blades 42. The fan 20 also includes an electric fan motor 48 that is configured to drive the fan blades 40 to induce air flow. In the illustrated embodiment, the modular fan case 44 has a rectangular outer surface 43 similar or identical to the surface 33 of the resonator 22. In addition, the illustrated chamber 46 has a generally cylindrical shape similar or identical to the inner surface of the resonator 22.

The resonator 22 may be utilized to suppress noise generated by the fan 20, such as tonal noise directly generated by the fan blades 42, the motor 48, and/or noise produced when turbulent air passes over system features. As noted above, the resonator 22 has a generally rectangular geometric outline or surface 43 based on the geometry of the casing 44 for the fan 20. In other embodiments, the resonator 22 may have a different geometric outline depending on the shape and size of a different corresponding cooling fan case. For example, the resonator 22 may have an octagonal geometric outline to correspond with a cooling fan having an octagonal casing. Matching the geometric outline of the resonator 22 and the geometric outline of the fan casing 44 facilitates alignment of the resonator 22 and fan 20, thus conserving space within the cooling system 14. Indeed, in some embodiments the geometric outline of the resonator 22 is confined to having only certain dimensions (e.g., height and width) corresponding to dimensions of the fan 20 or casing 44. Additionally, sizing the resonator 22 according to the size of the fan 20 maximizes the size of the resonator 22 within confines set by the fan 20, thus maximizing available space for the chambers 40, which are used for noise absorption.

The major opening 34 disposed in the resonator 22 facilitates air flow through the resonator 22 from the fan 20. In the illustrated embodiment, the major opening 34 is circular and sized to correspond to the cross-sectional flow area produced by the fan 20. In other words, the major opening 34 is sized (e.g., the radius adjusted) to correspond with the cross-sectional area of the volume the fan blades 42 of the fan 20 pass through. In other embodiments, the major opening 34 may have a different shape to correspond to a different flow area. Matching the major opening 34 with the flow area of the corresponding fan 20 facilitates alignment of the fan 20 with the resonator 22, such that undesirable flow characteristics and associated noises are reduced or prevented. For example, such an alignment may reduce flow losses that occur when air from the fan 20 strikes an unaligned surface of the resonator 22. Further, the alignment of the major opening 34 with the flow area of the fan 20 makes the transition section between the fan 20 and resonator 22 smooth, which reduces turbulence and the noise associated with such turbulence. These benefits may result whether the resonator 22 is located at the inlet of the fan 20 or at the outlet of the fan 20. Indeed, in some embodiments, resonators 22 are located both at the inlet and outlet of the fan 20.

Figure 3:
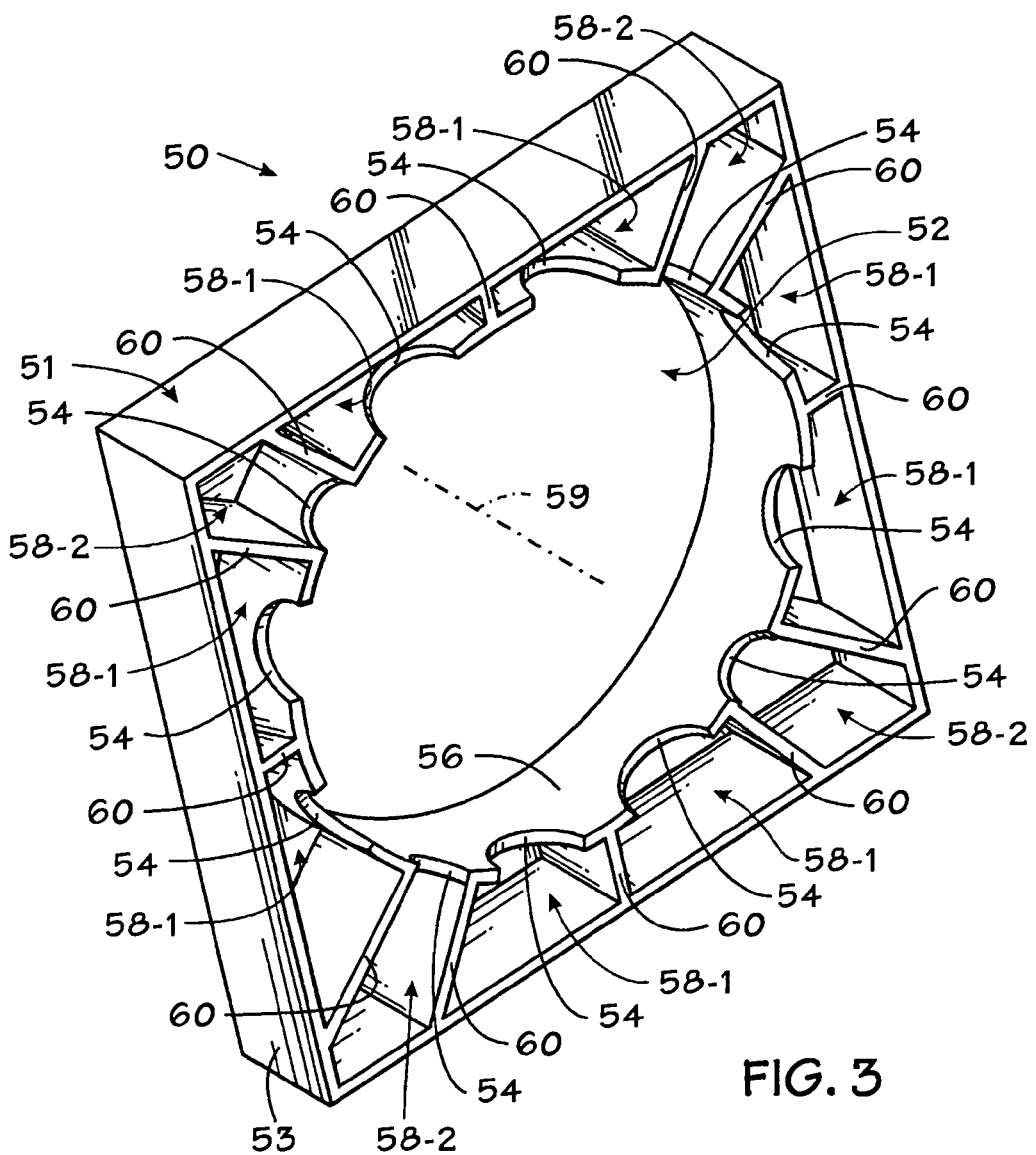
FIG. 3 is a cut away perspective view of a resonator having a hollow perforated shell structure in accordance with embodiments of the present invention.

FIG. 3 is a cut away perspective view of a resonator 50 having a hollow perforated shell structure 51 in accordance with embodiments of the present invention. Like the resonator 22 illustrated in FIG. 2, the resonator 50 includes a central passage or major opening 52 extending through a rectangular or modular outer wall structure 53, and a plurality of radial or minor openings 54 along an inner perimeter 56 of the major opening 52. The minor openings 56 extend into various resonance chambers 58 between the wall structure 53 and the inner perimeter 56. The major opening 52 may also be referred to as a primary opening, flow path, or cooling air flow conduit. The minor openings 54 may also be referred to as lateral openings, chamber openings, radial openings, or tonal suppression openings. The illustrated resonator 50 may be formed of various materials (e.g., plastic or metal), and may be formed in various shapes, and sizes.

In the illustrated embodiment, the resonator 50 includes twelve resonance chambers 58 and twelve corresponding minor openings 54 that facilitate access to the chambers 58 along the inner perimeter 56 (i.e., the cylindrical inner surface of the major opening 34). Two types or shapes of chambers 58 are included in the resonator 50. While both types are generally referred to herein by reference number 58, a first type is also designated by reference number 58-1, and a second type is designated by reference number 58-2. The number of resonance chambers may vary in different embodiments. For example, the resonator 22 in FIG. 2 includes four chambers 40 that are accessible via the minor openings 36 along the edge of the major opening 34 formed in the shell 32. These chambers 40 and 58 and minor openings 36 and 54 may be sized and configured to reduce noise levels for specific resonance frequencies. For example, in FIG. 3, four of the chambers 58 and corresponding minor openings 54 are configured for a first resonance frequency or range of frequencies, and the remaining eight chambers 58 and corresponding minor openings 54 are configured for a second, different resonance frequency or range of frequencies. Accordingly, the resonator 50 is specifically configured or tuned to suppress two different frequencies or ranges of frequencies. The embodiment in FIG. 2, which uses four same sized chambers 40 and four same sized minor openings 36 is configured or tuned to suppress a single resonance frequency or range of resonance frequencies. Each chamber of a resonator (e.g., resonators 22 and 50) in accordance with present embodiments may be designed or tuned to correspond to or attenuate a specific tonal noise or a plurality of tonal noises (e.g., 2, 3, 4, 5, 6, 7, 8, 9, 10, or more). Such attenuation may be improved by stacking multiple resonators together. In other words, the resonators 22 may be positioned one after another along a flow axis 59 relative to one or more fans 20. For example, a well tuned resonator may attenuate a pure tone more than 22 dB, and double-stacked resonators may reduce the tone 30 dB. Additionally, the resonator 50 can be tuned by varying the type of material forming the resonator 50 or varying the character (e.g., volume or type) of material disposed within the chambers 58.

Figure 4:
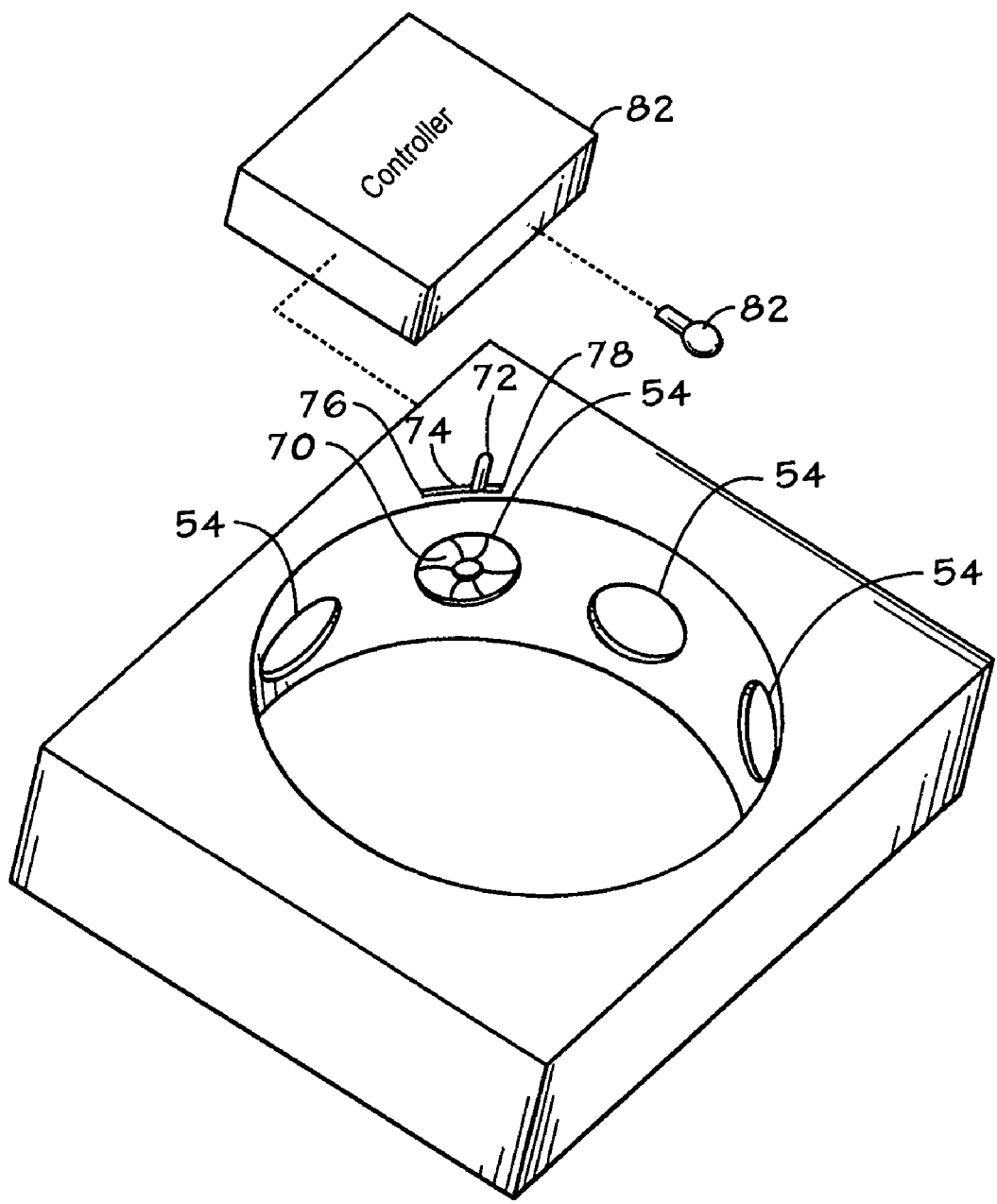
FIG. 4 is a perspective view of a resonator with an adjustable orifice in accordance with embodiments of the present invention.

As set forth above, the chambers 58 and the openings 54 may be sized or adjusted to facilitate suppression of specific tonal noises. In other words, the chambers 58 and openings 54 facilitate tuning of the resonator 50. The resonator 50 can be tuned for a specific frequency or range of frequencies by varying the volume or shape of the chambers 58, the size of the minor openings 54, or both. The volume may be varied by adjusting the location of separation walls 60, by adjusting the width of the resonator, or by adding, reducing, expanding or contracting material (e.g., layers of material or an expandable bladder) disposed within the chambers 58. The minor openings 54 may be adjusted by adding or removing material around the minor openings 54. Additionally, as illustrated in FIG. 4, one or all of the minor openings 54 may include an adjustable orifice 70. For example, the adjustable orifice 70 may be an iris diaphragm, which may include a series of overlapping pieces that are configured to fold in on each other or expand out to increase or decrease the size of the minor openings 54. In other words, the iris diaphragm may open or close in a circle to adjust the size of the minor openings 54 according to a desired tuning condition.

It should be noted that the adjustable orifice 70 may be configured for manual adjustment or for automatic adjustment (e.g., electrically activated). For example, in one embodiment, the adjustable orifice 70 can be manually adjusted with a lever 72 by sliding it along a path 74. As would be understood by one of ordinary skill in the art, the lever cooperates with mechanical elements of the adjustable orifice 70 to manipulate arrangement of the adjustable orifice 70 (e.g., from open to closed). In the illustrated embodiment, the path 74 has extreme ends 76 and 78, which correspond to open and closed arrangements of the adjustable orifice 70, respectively. In other words, if the lever 72 is positioned at extreme end 76, the adjustable orifice 70 may be open, and if the lever 72 is positioned at extreme end 78, the adjustable orifice 70 may be closed. A user may continually manually reposition the lever 72 to adjust for certain sound levels. In another example, the adjustable orifice 70 may be automatically controlled for dynamic operation in the field. Indeed, in the embodiment illustrated by FIG. 4, the adjustable orifice 70 may be managed by a control circuit or a controller (e.g., a proportional, integral, derivative or PID controller) 80. The controller 80 may adjust the arrangement of the adjustable orifice 70 based on sound levels or vibrations detected with a detection device (e.g., a microphone) 82. It should be noted that the controller may also control other adjustable aspects of the resonator 50.

Each of the chambers 58 and minor openings 54 may be sized to correspond to a different resonance frequency or to have similar resonance frequencies. The size of the minor openings 54 and the shape of the chambers 58 define cavity resonance or standing wave modes of the chambers 58. The size of the minor openings 54 into the chambers 58 may relate to an acoustical power transmission path of a tone wave into the chambers 58. In accordance with some embodiments, estimated values for use in tuning the resonator 50 may be acquired using the following equation:

$$f_0 = (c_0/2)(r/(VA_0))^{1/2}$$

where:
$f_0$=tonal frequency in Hz
$c_0$=the speed of sound in air
r=radius of resonator holes
V=chamber volume
$A_0$=correction constant (usually obtained from empirical data), which is a function of material, cavity shape, and ratio of opening depth and opening size.

Figure 5:
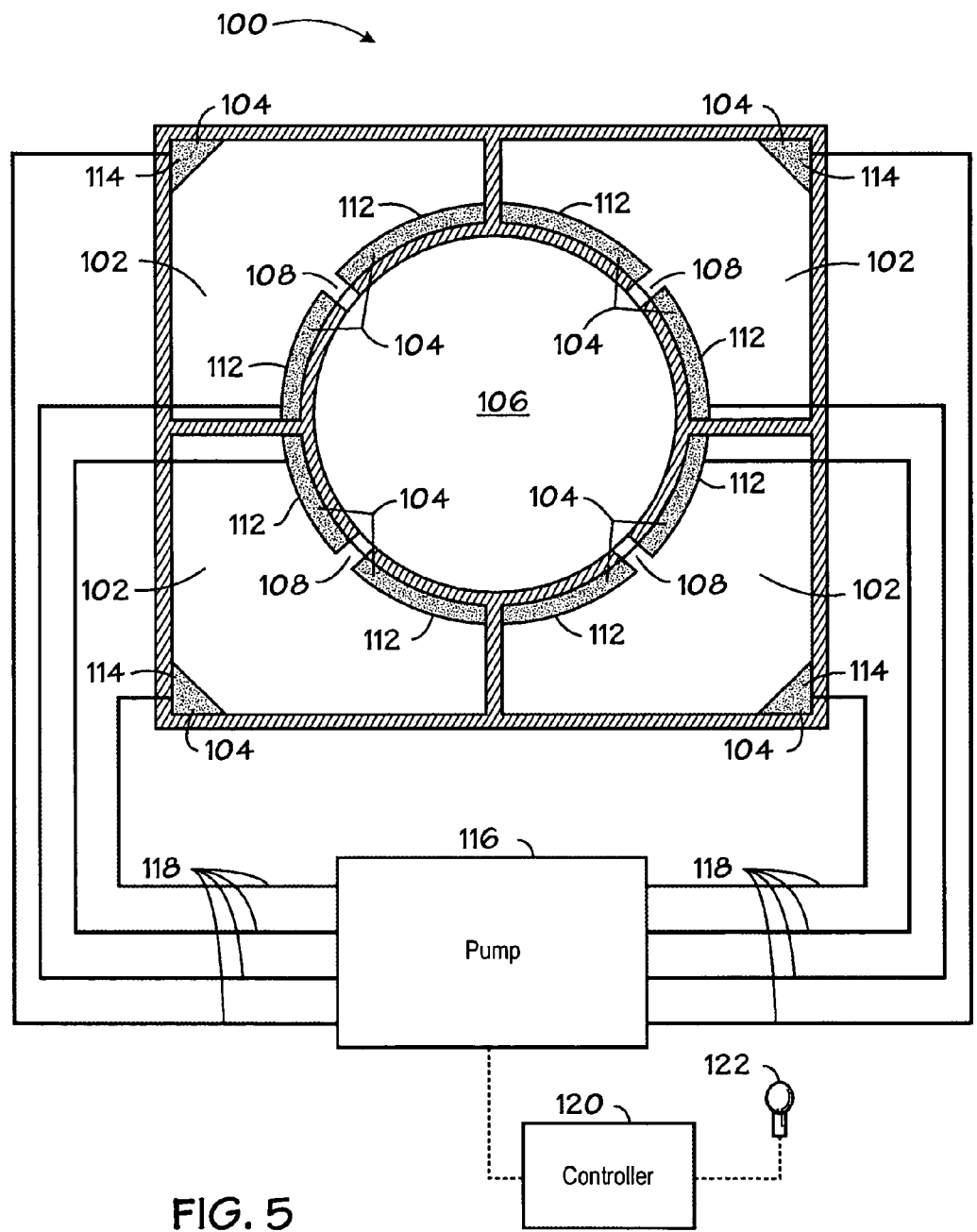
FIG. 5 is a cross-sectional side view of a resonator with chambers including absorption media in accordance with embodiments of the present invention.

FIG. 5 is a cross-sectional side view of a resonator 100 with chambers 102 including absorption media 104 in accordance with embodiments of the present invention. Like the resonator 22 illustrated in FIG. 2, the resonator 100 includes a major opening 106 that facilitates air flow and minor openings 108 along its inner perimeter 110 that open into various resonance chambers 102. The major opening 106 may also be referred to as a primary passage, flow path, or cooling air flow conduit. The minor openings 108 may also be referred to as lateral openings, chamber openings, radial openings, or tonal suppression openings. The embodiment illustrated in FIG. 5 is different than the embodiment illustrated in FIG. 2 in that it includes the absorption media 104 in the chambers 102. The absorption media 104 may include layers of material or adjustable packets (e.g., a bladder configured to be filled or emptied of air or liquid). Tonal noise passing through the minor openings 108 may excite the absorption media 104, which may operate to absorb the tonal noise. The absorption media 104 may also increase the tonal absorption bandwidth.

In the illustrated embodiment, the absorption media 104 includes four inner absorption components 112 and four outer absorption components 114. The inner absorption components 112 include holes that align with the minor openings 108. These absorption components 112 and 114 may be utilized to tune the resonator 100. For example, to reduce the volume of a particular chamber 110 to correspond with tuning parameters for a particular tonal noise, the volume of one or multiple of the absorption components 112, 114 may be increased or decreased. In some embodiments, one or more of the absorption components 112, 114 may include an inflatable or expandable bladder that can be adjusted manually or automatically. For example, air or other fluids (e.g., gel) may be pumped in or removed from the absorption components 112, 114 to change their volume This may be achieved via a pump 116 and flow lines 118 that are coupled to the absorption components 112, 114. Specifically, in one embodiment the absorption components 112, 114 may include balloons that are automatically expanded or contracted by filling them with fluid via the pump 116 based on signals from a controller 120. The controller 120 (e.g., PID controller) may adjust the absorption components 112, 114 based on sound or vibration levels monitored with a detection device (e.g., microphone) 122. In another example, the absorption components may be manually adjusted. Specifically, for example, a layer may simply be added or removed to change characteristics of the absorption components 112, 114. Additionally, the material of the absorption components 112, 114 may be changed to facilitate tuning. For example, a hard material or a soft material may be used depending on the desired tuning parameters.

Figure 6:
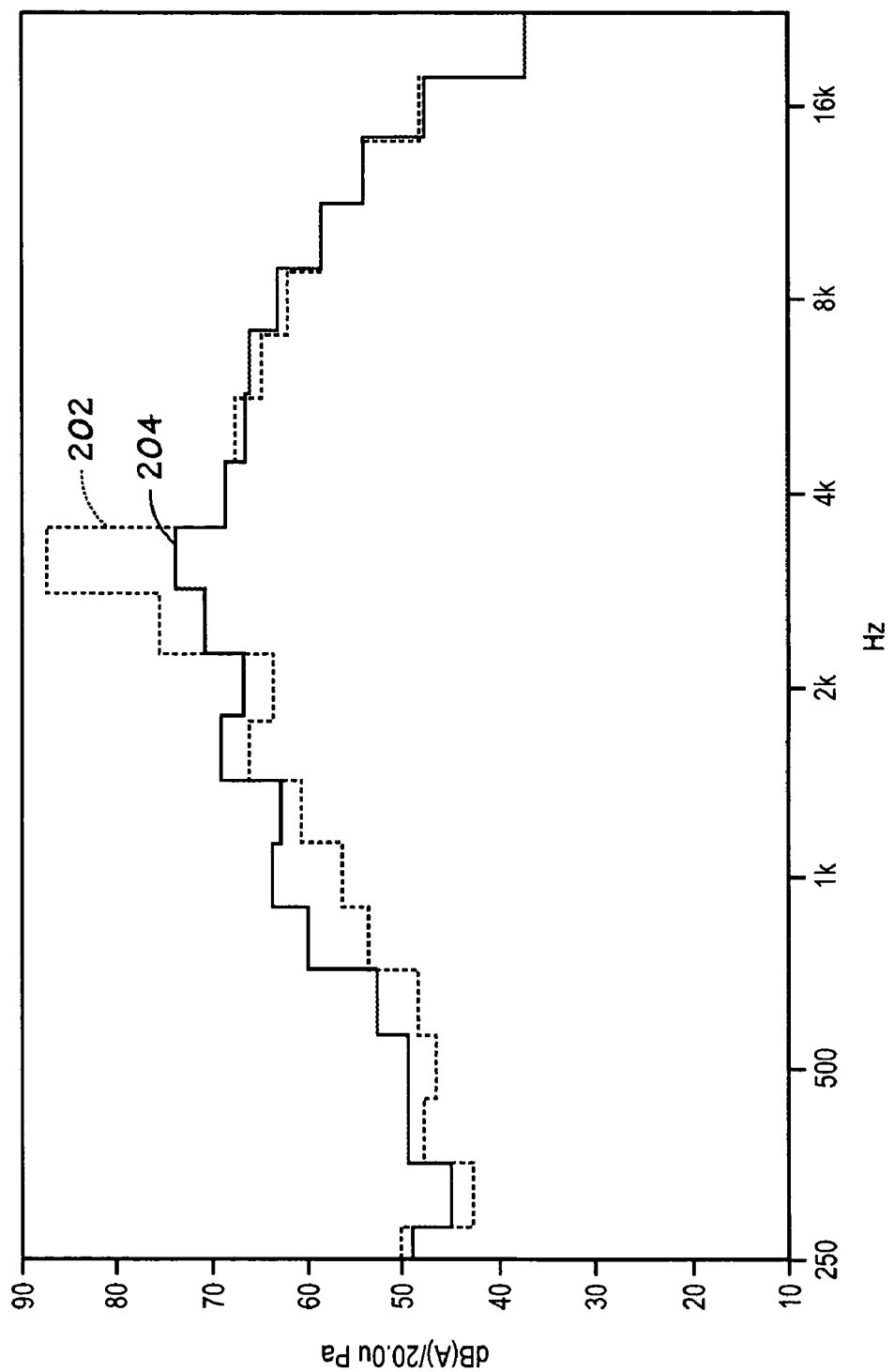
FIG. 6 represents a pair of bar graphs illustrating empirical data that demonstrates tonal noise reduction in accordance with embodiments of the present invention.

FIG. 6 includes a pair of overlapping bar graphs illustrating empirical data that demonstrates tonal noise reduction in accordance with embodiments of the present invention. Specifically, a first bar graph 202 of the pair represents a plot of sound pressure level on the Y-axis versus frequency (Hz) on the X-axis. The data in the first bar graph 202 was acquired without using a resonator for subsets of noise frequencies. Specifically, the first bar graph 202 was acquired without using a resonator for ⅓ octave bands (i.e., one third of a frequency range with an upper limit that is twice the frequency of its lower limit) from 250 Hz to 20,000 Hz. Similar to the first bar graph 202, the second bar graph 204 represents a plot of sound intensity on the Y-axis versus frequency (Hz) on the X-axis. However, the data in the second bar graph 204 was acquired while using a single resonator for the ⅓ octave bands. Comparison of the first graph 202 with the second graph 204 illustrates a reduction of noise achieved in accordance with present embodiments. Specifically, comparing the graphs 202 and 204 shows significant noise reduction around the 3 k Hz frequency achieved by utilizing a single resonator in accordance with embodiments of the present invention.

The invention claimed is:

1. A computer system, comprising:
   a resonator configured to suppress noise from an electric fan, wherein the resonator is configured to be mounted to a housing of the electric fan, and wherein the resonator comprises:
   an enclosure having an outer perimeter, wherein the outer perimeter of the enclosure matches an outer perimeter of the housing of the electric fan;
   a major opening through the enclosure and defining an inner perimeter of the enclosure;
   a minor opening disposed along the inner perimeter of the enclosure; and
   a chamber coupled to the minor opening within the enclosure between the inner and outer perimeters of the enclosure.

2. The system of claim 1, comprising noise absorption media disposed within the chamber.

3. The system of claim 2, wherein the noise absorption media is adjustable.

4. The system of claim 2, wherein the noise absorption media comprises an inflatable bladder.

5. The system of claim 1, comprising an adjustable orifice disposed within the minor opening.

6. The system of claim 1, wherein the inner perimeter is sized and oriented to align with the flow path of the electric fan.

7. The system of claim 1, wherein axes of the minor opening and the major opening are generally crosswise relative to one another.

8. The system of claim 1, comprising a plurality of minor openings disposed along the inner perimeter of the enclosure and a plurality of chambers coupled to the minor openings within the enclosure.

9. The system of claim 1, wherein the minor opening, or the chamber, or both have different sizes, or shapes, or both configured to reduce a plurality of different tonal noises from the electric fan.

10. The system of claim 1, comprising the electric fan.

11. A system, comprising:
    a resonator comprising:
    a closed chamber along the air flow path of a fan;
    an opening into, wherein the opening is oriented generally crosswise relative to the flow path, and geometrical parameters of the opening and the closed chamber cooperate to suppress noise from the fan; and
    adjustable noise absorption media disposed within the closed chamber, wherein the resonator is configured to be mounted to a housing of the fan, and wherein the resonator comprises an enclosure having an outer perimeter, and wherein the outer perimeter of the enclosure matches an outer perimeter of the housing of the electric fan.

12. The system of claim 11, comprising an electronic device.

13. The system of claim 12, comprising a fan having an air flow path across or through the electronic device.

14. The system of claim 12, wherein the electronic device comprises a blade server, a computer, a processor, memory, a hard drive, a power supply, a video device, and audio device, or a combination thereof.

15. The system of claim 11, comprising a plurality of resonators that have different sizes, shapes, or both of closed chambers and openings into the chambers.

16. The system of claim 11, comprising a plurality of resonators that include a pair of resonators disposed about opposite sides of the fan.

17. The system of claim 11, wherein the adjustable noise absorption media is adjustable in density, or volume, or geometry, or a combination thereof.

18. The system of claim 11, wherein the adjustable noise absorption media comprises an inflatable bladder.

19. The system of claim 11, comprising:
    a detection device; and
    a control circuit configured to control access to the opening or adjust the adjustable absorption media based on noise levels detected by the detection device.

20. The system of claim 19, wherein the detection device is a microphone.

21. The system of claim 11, comprising a size adjustable orifice disposed within the opening.

22. A method, comprising:
    measuring noise levels produced by a fan having a flow path through a major opening of a resonator, wherein the resonator is configured to be mounted to a housing of the fan, and wherein the resonator comprises an enclosure having an outer perimeter, and wherein the outer perimeter of the enclosure matches an outer perimeter of the housing of the electric fan; and
    adjusting an absorption component within a chamber of the resonator based on the measured noise levels to suppress noise from the fan, wherein a minor opening is disposed along an inner perimeter of the resonator defined by the major opening of the resonator, and wherein the chamber is between the inner perimeter and an outer perimeter of the resonator.

23. The method of claim 22, wherein adjusting the absorption component comprises adjusting an amount of noise absorption media disposed within the chamber.

24. The method of claim 22, wherein measuring noise levels comprises measuring vibration levels.

25. The method of claim 22, wherein adjusting the absorption component comprises inflating or deflating an inflatable bladder.

26. A method, comprising:
    measuring noise levels produced by a fan having a flow path through a major opening of a resonator, wherein the resonator is configured to be mounted to a housing of the fan, wherein the resonator comprises an enclosure comprising an outer perimeter configured to match an outer perimeter of the fan, and wherein the resonator is disposed around a perimeter of the flow path of the fan; and adjusting an iris diaphragm in a minor opening on a resonator between substantially open and substantially closed configurations based on the measured noise levels to suppress noise from the fan, wherein the minor opening is disposed along an inner perimeter of the resonator defined by the major opening of the resonator, and wherein a chamber is between the inner perimeter and an outer perimeter of the resonator.

27. A system, comprising:

an enclosure comprising an outer perimeter configured to match an outer perimeter of an electric fan housing; and a resonator disposed in the enclosure around a perimeter of an air flow path of the electric fan, the resonator comprising:

a closed chamber along the air flow path of a fan;

an opening into the closed chamber, wherein the opening is oriented generally crosswise relative to the flow path, and geometrical parameters of the opening and the closed chamber cooperate to suppress noise from the fan; and noise absorption media disposed within the closed chamber, wherein the noise absorption media comprises an expandable bladder.

28. The system of claim 27, wherein the expandable bladder is configured to be filled with air or a gas.

29. The system of claim 27, wherein the expandable bladder is configured to be filled with a liquid or a gel.

* * * * *

UNITED STATES PATENT AND TRADEMARK OFFICE
CERTIFICATE OF CORRECTION

| | | |
|---|---|---|
| PATENT NO. | : 7,891,464 B2 | Page 1 of 1 |
| APPLICATION NO. | : 11/453694 | |
| DATED | : February 22, 2011 | |
| INVENTOR(S) | : Punan Tang et al. | |

It is certified that error appears in the above-identified patent and that said Letters Patent is hereby corrected as shown below:

On the Title page, in field (73), Assignee, in column 1, line 1,
    delete "Development," insert -- Development Company, --, therefor.

Signed and Sealed this

Thirteenth Day of September, 2011

David J. Kappos
*Director of the United States Patent and Trademark Office*